United States Patent
Valente (10) Patent No.: US 9,732,841 B2
(45) Date of Patent: Aug. 15, 2017

(54) DRIVELINE COMPONENT WITH MECHANISM TO CONTROL LUBRICANT LEVEL

(71) Applicant: American Axle & Manufacturing, Inc., Detroit, MI (US)

(72) Inventor: Paul J. Valente, Berkley, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 100 days.

(21) Appl. No.: 14/930,676

(22) Filed: Nov. 3, 2015

(65) Prior Publication Data

US 2017/0122427 A1 May 4, 2017

(51) Int. Cl.
*F16H 57/04* (2010.01)

(52) U.S. Cl.
CPC ....... *F16H 57/0447* (2013.01); *F16H 57/045* (2013.01); *F16H 57/0457* (2013.01); *F16H 57/0473* (2013.01); *F16H 57/0483* (2013.01)

(58) Field of Classification Search
None
See application file for complete search history.

(56) References Cited

U.S. PATENT DOCUMENTS

| | | | |
|---|---|---|---|
| 3,182,527 A * | 5/1965 | Bryan | F16H 57/0483 184/1.5 |
| 5,505,112 A | 4/1996 | Gee | |
| 6,523,435 B2 | 2/2003 | Ruehle et al. | |
| 7,189,178 B2 | 3/2007 | Weith | |
| 8,707,826 B2 | 4/2014 | Jacobs et al. | |
| 8,795,126 B2 | 8/2014 | Downs et al. | |

* cited by examiner

*Primary Examiner* — Dirk Wright
(74) *Attorney, Agent, or Firm* — Harness, Dickey & Pierce, P.L.C.

(57) ABSTRACT

A driveline component with a housing, which defines a sump, a power-transmitting device received in the housing, a reservoir coupled to the housing, and a reservoir level control device (RLCD). The reservoir has an inlet and outlet and defines a cavity. The RLCD has a skimmer and an outlet port flow control (OPFC). The skimmer is coupled to the housing for movement between a first position, in which the skimmer is positioned relative to a driven component of the power-transmitting device to skim the lubricant from the driven component, and a second position. The OPFC can be operated in a first condition, in which fluid flow from the outlet port is substantially blocked to thereby inhibit a flow of the lubricant in the cavity to the sump, and a second condition, in which fluid flow through the outlet port from the cavity to the sump is permitted.

21 Claims, 4 Drawing Sheets

DRIVELINE COMPONENT WITH MECHANISM TO CONTROL LUBRICANT LEVEL

FIELD

The present disclosure relates to a driveline component with a mechanism to control a lubricant level in at least a portion of the driveline component.

BACKGROUND

This section provides background information related to the present disclosure which is not necessarily prior art.

It is common for drivelines utilizing a disconnecting axle assembly to employ a wet, multi-plate friction clutch to selectively control the transmission of torque through the axle assembly. It is known in the art that the oil in a wet, multi-plate friction clutch can produce drag when the friction clutch is deactivated that will tend to transmit torque across the friction clutch. While the magnitude of the torque is relatively small, it can nevertheless be desirable in some situations to minimize or eliminate any torque that is transmitted across the friction clutch when the friction clutch is deactivated. Additionally, it may be desirable in some situations to restrict the amount of lubricant that is contained in a driveline component, such as a power take-off unit, axle assembly, or transfer case, to reduce losses associated with the churning of the lubricant.

SUMMARY

This section provides a general summary of the disclosure, and is not a comprehensive disclosure of its full scope or all of its features.

In one form, the present disclosure provides a driveline component that includes a power-transmitting device, a housing, a reservoir, and a reservoir level control device. The power-transmitting device has an input member, a pair of output members, and a differential-and-clutch assembly that includes at least one clutch. The differential-and-clutch assembly is configured to operate in a first mode, in which rotary power is transmitted from the input member to the output members in a manner that permits speed differentiation between the output members, and in a second mode in which rotary power is not transmitted through the at least one clutch to thereby decouple the input member from at least one of the output members. The housing houses the power-transmitting device. The housing includes a sump that is configured to hold a lubricant that is configured to lubricate at least a portion of the differential and clutch assembly. The reservoir is coupled to the housing and defines a reservoir cavity, a reservoir inlet and a reservoir outlet. The reservoir inlet and outlet are in fluid communication with the reservoir cavity. The reservoir level control device has a lubricant skimmer and an outlet port flow control. The lubricant skimmer is movably coupled to the housing for movement between a first skimmer position, in which the skimmer is positioned relative to a driven component of the differential-and-clutch assembly to skim the lubricant from the driven component when the driven component is rotated in a predetermined rotational direction and rotary power is transmitted through the at least one clutch, and a second skimmer position, the outlet port flow control being operable in a first condition, in which fluid flow from the outlet port is substantially blocked to thereby inhibit a flow of the lubricant in the reservoir cavity to the sump, and a second condition, in which fluid flow through the outlet port from the reservoir cavity to the sump is permitted. Movement of the skimmer between the first and second skimmer positions is coordinated with operation of the outlet port flow control such that: the outlet port flow control in the first condition when the skimmer is disposed in the first skimmer position; and the outlet port flow control is in the second condition when the skimmer is disposed in the second skimmer position.

In another form, the present teachings provide an assembly that includes a power-transmitting device, a housing, a reservoir, a device for collecting lubricant and a device for controlling a fluid level. The power-transmitting device has an input member, a pair of output members, and a differential-and-clutch assembly that includes at least one clutch. The differential-and-clutch assembly is configured to operate in a first mode, in which rotary power is transmitted from the input member to the output members in a manner that permits speed differentiation between the output members, and in a second mode in which rotary power is not transmitted through the at least one clutch to thereby decouple the input member from at least one of the output members. The housing houses the power-transmitting device. The housing includes a sump that is configured to hold a lubricant that is configured to lubricate at least a portion of the differential and clutch assembly. The reservoir is coupled to the housing and defines a reservoir cavity, a reservoir inlet and a reservoir outlet. The reservoir inlet and outlet are in fluid communication with the reservoir cavity. The lubricant collecting device is configured to skim lubricant from a rotary component in the power-transmitting device, while the fluid level control device is configured to control a level of the fluid contained in the reservoir.

In yet another form, the present teachings provide a driveline component that includes a power-transmitting device, a housing, a reservoir and a reservoir level control device. The power-transmitting device has an input member, at least one output member, and a rotary power transmitting component that transmits rotary power between the input member and the output member(s). The rotary power transmitting component includes gearing or at least one clutch or a combination of gearing and at least one clutch. The housing houses the power-transmitting device and has a sump that is configured to hold a lubricant that is configured to lubricate at least a portion of the rotary power transmitting component. The reservoir is coupled to the housing. The reservoir defines a reservoir cavity and having a reservoir inlet and a reservoir outlet that are in fluid communication with the reservoir cavity. The reservoir level control device has a lubricant skimmer and an outlet port flow control. The lubricant skimmer is movably coupled to the housing for movement between a first skimmer position, in which the skimmer is positioned relative to a driven component of the rotary power transmitting component to skim the lubricant from the driven component when the driven component is rotated in a predetermined rotational direction, and a second skimmer position. The outlet port flow control is operable in a first condition, in which fluid flow from the outlet port is substantially blocked to thereby inhibit a flow of the lubricant in the reservoir cavity to the sump, and a second condition, in which fluid flow through the outlet port from the reservoir cavity to the sump is permitted. Movement of the skimmer between the first and second skimmer positions is coordinated with operation of the outlet port flow control such that a) the outlet port flow control in the first condition when the skimmer is disposed in the first skimmer position;

and b) the outlet port flow control is in the second condition when the skimmer is disposed in the second skimmer position.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
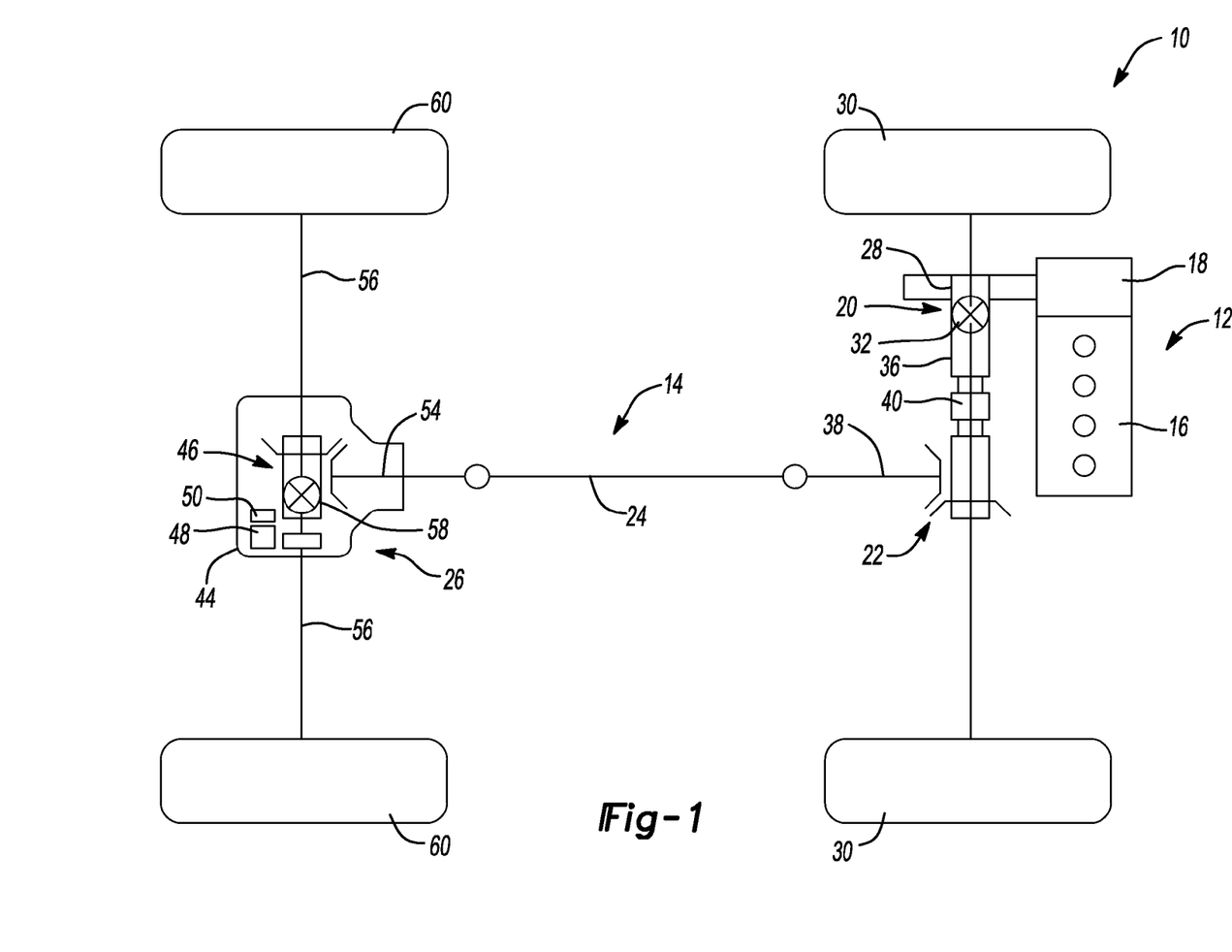
FIG. 1 is a schematic top plan illustration of an exemplary vehicle constructed in accordance with the teachings of the present disclosure.

With reference to FIG. 1 of the drawings, an exemplary vehicle 10 can have a power train 12 and a drive train 14. The power train 12 can be conventionally constructed and can comprise a power source 16 and a transmission 18. The power source 16 can be configured to provide propulsive power and can comprise an internal combustion engine and/or an electric motor, for example. The transmission 18 can receive propulsive power from the power source 16 and can output power to the drive train 14. The transmission 18 can have a plurality of automatically or manually selected gear ratios. The drive train 14 in the particular example provided is of an all-wheel drive configuration, but those of skill in the art will appreciate that the teachings of the present disclosure are applicable to other drive train configurations, including two-wheel drive and four-wheel drive configurations.

The drive train 14 can include a front axle assembly 20, a power take-off unit (PTU) 22, a prop shaft 24 and a rear axle assembly 26. An output of the transmission 18 can be coupled to an input of the front axle assembly 20 to drive an input member 28 of the front axle assembly 20. The front axle assembly 20 can be configured to drive a pair of front vehicle wheels 30 and can be conventional in its construction and operation. In the particular example provided, the front axle assembly 20 includes a front differential gearset 32 that can permit power transmission between the input member 28 and the front vehicle wheels 30 in a manner that permits speed differentiation between the front vehicle wheels 30.

The PTU 22 can be conventional in its construction and operation and can be configured to transmit rotary power to the rear axle assembly 26 on either a full-time basis or a part-time basis. The PTU 22 can include a PTU input member 36, which can receive rotary power from a rotatable part of the front axle assembly 20, such as the input member 28 or the front axle assembly 20, and a PTU output member 38 that can transmit rotary power to the prop shaft 24. The prop shaft 24 can couple the PTU output member 38 to the rear axle assembly 26 such that rotary power output by the PTU 22 is received by the rear axle assembly 26. In the example provided, the front axle assembly 20 is driven on a full-time basis and the rear axle assembly 26 is driven on a part time basis so that the drive train 14 can be selectively operated as a front-wheel drive mode or an all-wheel drive mode. To facilitate part-time operation of the rear axle assembly 26, the PTU 22 further includes a first clutch 40 that can be configured to inhibit the transmission of rotary power between the PTU input member 36 and the PTU output member 38.

The rear axle assembly 26 can include an axle housing 44, a power-transmitting device 46, a reservoir 48 and a reservoir level control device 50.

The power-transmitting device 46 can have an input member 54, a pair of output members 56 and a differential-and-clutch assembly 58. The input member 54 is configured to receive rotary power from the PTU output member 38 (e.g., via the prop shaft 24) and to transmit the rotary power to the differential-and-clutch assembly 58, while the output members 56 are configured to transmit rotary power between the differential-and-clutch assembly 58 and a respective one of a pair of rear vehicle wheels 60.

Figure 2:
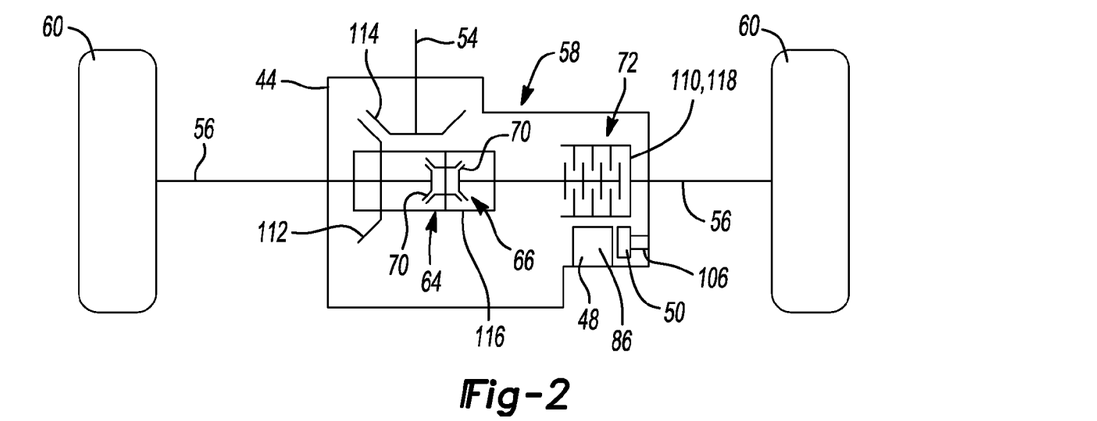
FIG. 2 is a schematic to plan illustration of a portion of the vehicle of FIG. 1, illustrating a rear axle assembly in more detail.
Figure 3:
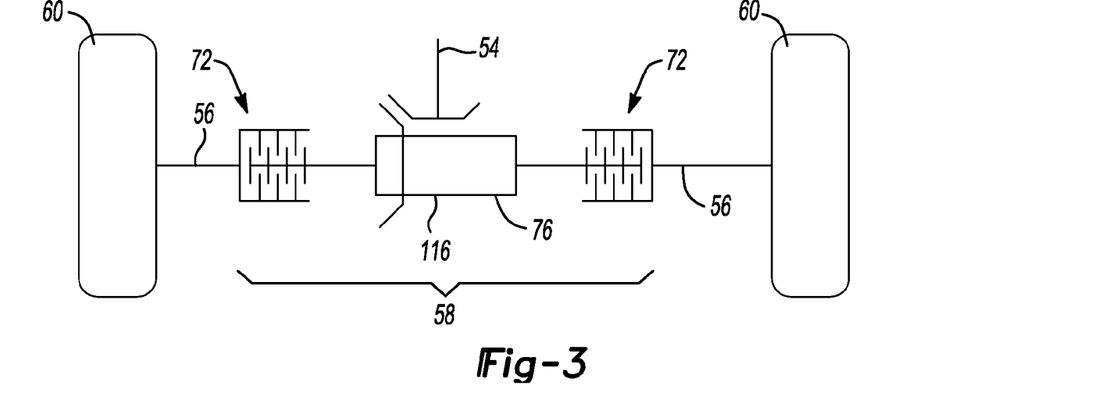
FIG. 3 is a view similar to that of FIG. 2 but depicting an alternately constructed rear axle assembly.

With reference to FIG. 2, the differential-and-clutch assembly 58 can comprise any means for controlling power distribution between the input member 54 and the output members 56. In one form, the differential-and-clutch assembly 58 can comprise a differential assembly 64 having a differential gearset 66 (e.g., a bevel gearset, a helical gearset), which can have a pair of differential outputs 70, and one or more clutches 72 that can be employed to inhibit transmission of rotary power between one or both of the rear vehicle wheels 60 and the input member 54. The one or more clutches 72 can comprise a single clutch that could be employed to selectively inhibit the transmission of rotary power between the input member 54 and one or both of the differential gearset 66, or between one or both of the differential outputs 70 and one or both of the output members 56. Alternatively, as shown in FIG. 3, the differential-and-clutch assembly 58 could comprise a spool or spindle 76, which can be driven by the input member 54, a pair of clutches, such as friction clutches 72, that can be driven by the spindle 76 and disposed in parallel power paths in which each power path extends between the input member 54 and an associated one of the rear vehicle wheels 60. Returning to FIG. 2, the differential-and-clutch assembly 58 can be operable in a first mode, in which rotary power is transmitted from the input member 54 to the output members 56 in a manner that permits speed differentiation between the output members 56, and in a second mode in which rotary power is not transmitted through one or more clutches 72 to thereby decouple the input member 54 from at least one of the output members 56.

Figure 4:
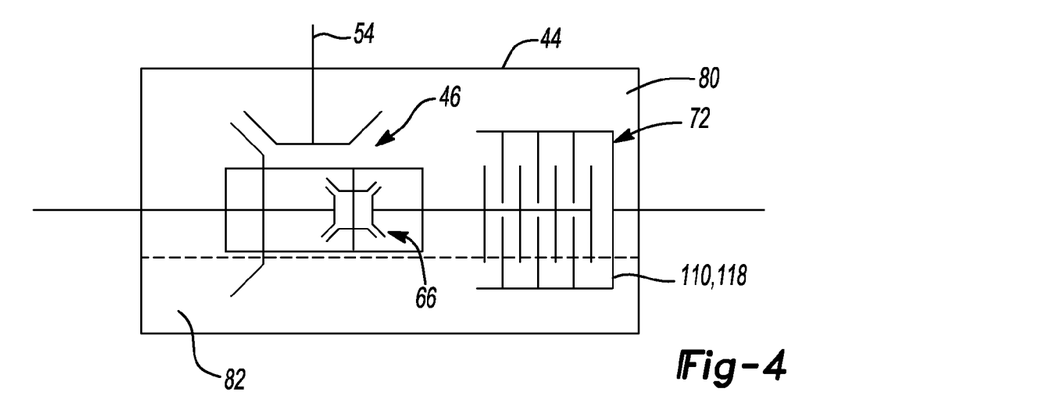
FIG. 4 is a rear elevation illustration of the portion of the vehicle that is shown in FIG. 2.

In FIG. 4, the axle housing 44 can define an internal cavity 80, in which the power-transmitting device 46 can be housed, and a sump 82 that is configured to hold a lubricant that is configured to lubricate at least a portion of the differential-and-clutch assembly 58. In the particular example provided, the differential-and-clutch assembly 58 employs a single fluid for lubrication of the differential gearset 66, lubrication of the one or more clutches 72, and actuation of the one or more clutches 72. It will be appreciated, however, that more than one fluid could be employed to lubricate and/or actuate the differential-and-clutch assembly 58.

Figure 5:
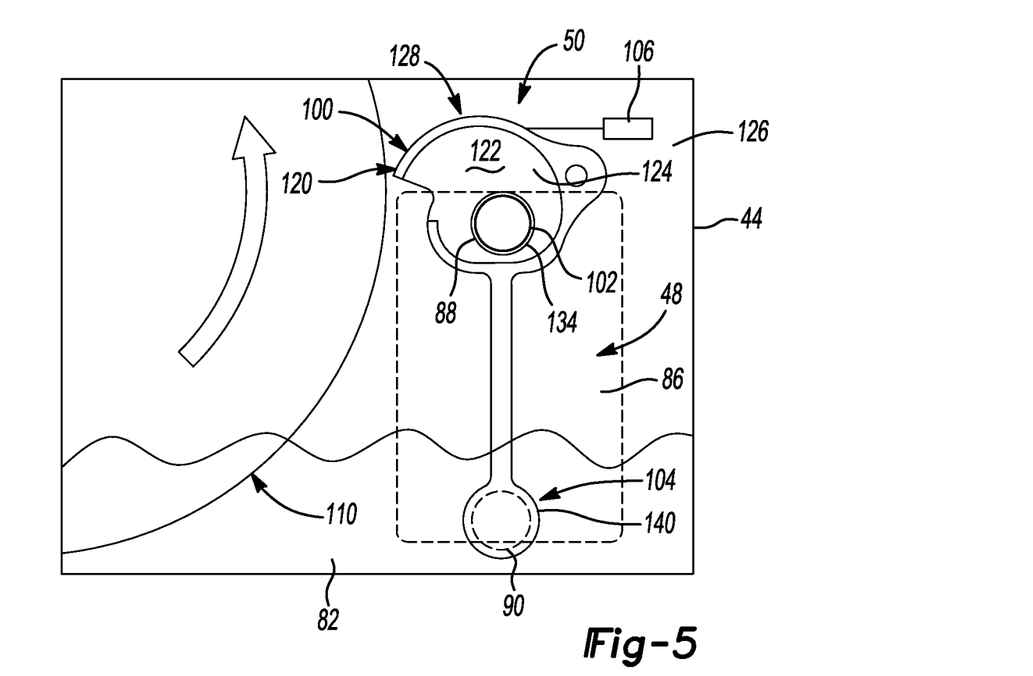
FIG. 5 is a side elevation view of a portion of the rear axle assembly of FIG. 1.

With reference to FIGS. 2 and 5, the reservoir 48 can be coupled to the axle housing 44 and can define a reservoir cavity 86. The reservoir 48 can include an inlet port 88 and an outlet port 90 that are in fluid communication with the reservoir cavity 86. In the particular example provided, the reservoir 48 is integrally and unitarily formed with the axle housing 44, but it will be appreciated that the reservoir 48 could be formed as a discrete component and could be coupled to (e.g., directly mounted in) the axle housing 44.

Figure 6:
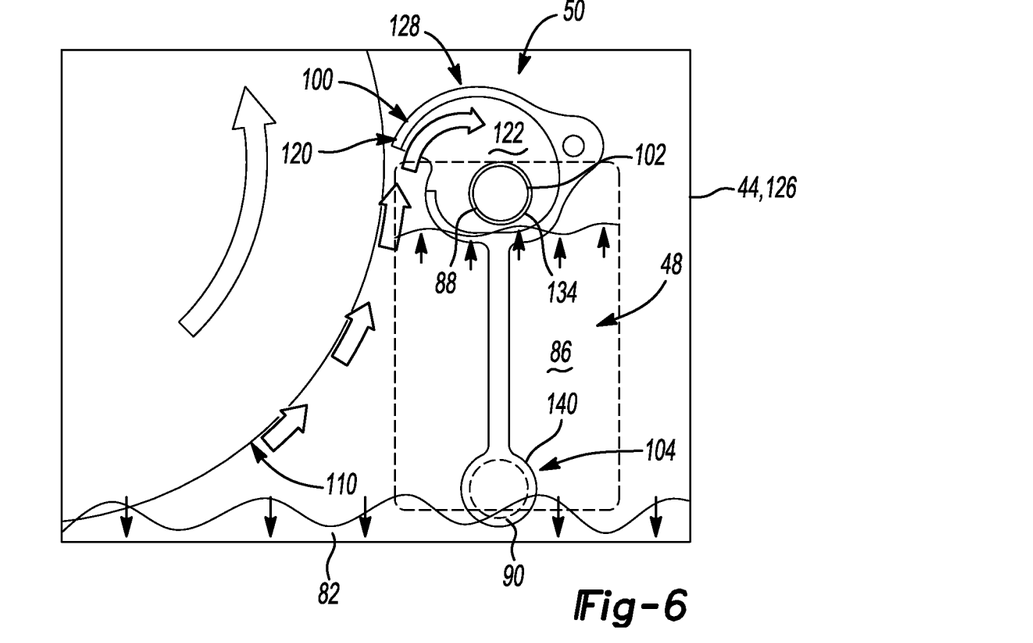
FIGS. 6 and 7 are views similar to that of FIG. 5 but depicting the rear axle assembly in operation.
Figure 7:
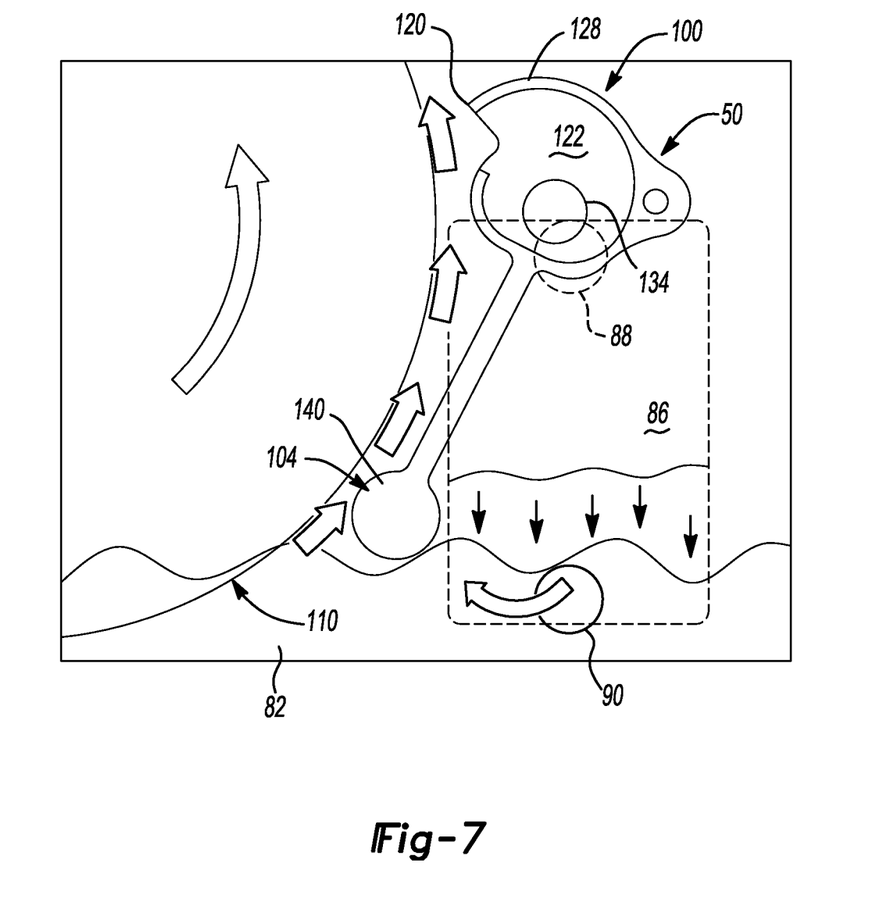

The reservoir level control device 50 can have a scraper or lubricant skimmer 100, an inlet port flow control 102, an outlet port flow control 104 and optionally, an actuator 106. The lubricant skimmer 100 can be movably coupled to the axle housing 44 for movement relative to a driven component 110 of the differential-and-clutch assembly 58 between a first skimmer position, which is shown in FIG. 6, and a second skimmer position that is shown in FIG. 7. The driven component 110 can be any component of the differential-and-clutch assembly 58 that is configured to rotate (i.e., relative to the axle housing 44 and the reservoir 48) through the lubricant in the sump 82 when rotary power is transmitted through or into the driven component 110 to cause it to rotate in a predetermined rotational direction during operation of the drivetrain 14. In one form, the driven component 110 can be a ring gear 112 that transmits rotary power between an input pinion 114 and a case, spool or shaft 116, as shown in FIG. 3. In another form, the driven component 110 is a component of the one or more clutches 72, such as a clutch basket 118 (e.g., outer clutch basket) on the output side of the friction clutch that is shown in FIG. 4. Accordingly, it will be appreciated that the driven component 110 could be coupled for rotation with one of the output members 56 (e.g., a clutch output member of the one or more clutches 72 or a component that is coupled for rotation with the clutch output member), in which case the driven component 110 will rotate during operation of the drivetrain 14 in any mode, including the front-wheel drive mode and the all-wheel drive mode, or that the driven component 110 could be disposed in a power path for transmitting rotary power at a location that is between the input member 54 and an input of the one or more clutches 72 so as to rotate relative to the axle housing 44 only when the one or more clutches 72 are transmitting rotary power.

Returning to FIGS. 2 and 5 through 7, when positioned in the first skimmer position, the lubricant skimmer 100 is positioned relative to the driven component 110 of the differential-and-clutch assembly 58 to skim the lubricant from the driven component 110 at a first rate. When positioned in the second skimmer position, the lubricant skimmer 100 is positioned relative to the driven component 110 to skim lubricant from the driven component 110 at a second rate (when the driven component 110 is driven in the predetermined rotational direction at a predetermined speed when a predetermined quantity of lubricant is disposed in the sump 82) that is relatively lower than the first rate. Those of skill in the art will appreciate that when the driven component 110 rotates through the lubricant in the sump 82, lubricant contacting the driven component 110 will tend to cling to the driven component 110 and that such lubricant may be skimmed off the driven component 110 for use in lubricating various components of the differential-and-clutch assembly 58. In the particular example provided, the lubricant skimmer 100 does not contact the lubricant that clings to the driven component 110 when the lubricant skimmer 100 is in the second skimmer position. Moreover, lubricant skimmed from the driven component 110 is directed into the reservoir cavity 86, where it can be stored as needed instead of being returned immediately to the sump 82.

The lubricant skimmer 100 can include a scraping member 120 and a scraper cavity 122 that is at least partly bounded by the scraping member 120 to provide the lubricant skimmer 100 with a container-like shape. Stated another way, the scraping member 120 can include a plate member 124, which is pivotally mounted to a wall member 126 of the reservoir 48, and perimeter wall 128 that that surrounds a portion of the plate member 124 to define the scraper cavity 122. A portion of the perimeter wall 128 of the scraping member 120 is configured to intersect the film of lubricant that clings to the driven component 110 (to scrape fluid from the film of lubricant clinging to the driven component 110) when the lubricant skimmer 100 is in the first skimmer position and the driven component 110 is driven in the predetermined rotational direction, fluid scraped by the scraping member 120 can flow into the scraper cavity 122, which is in fluid communication with the inlet port flow control.

The inlet port flow control 102 can comprise a valve element that can be movably coupled to the axle housing 44. Optionally, movement of the valve element of the inlet port flow control 102 can be coordinated with the movement of the lubricant skimmer 100. In the particular example provided, the inlet port flow control 102 comprises an aperture 134 that is formed through the plate member 124 of the scraping member 120. The aperture 134 is positioned on the plate member 124 in a manner that aligns with the inlet port 88 in the reservoir 48 when the lubricant skimmer 100 is in the first skimmer position to thereby permit lubricant in the scraper cavity 122 to flow through the inlet port flow control 102 and the inlet port 88 into the reservoir cavity 86. In the example provided, placement of the lubricant skimmer 100 in the second skimmer position pivots the aperture 134 out of alignment with the inlet port 88 so that the plate member 124 blocks the inlet port 88 to thereby inhibit a flow of the lubricant through the inlet port 88 and into the reservoir cavity 86 as shown in FIG. 7. Alternatively, the plate member 124 could substantially block the inlet port 88 so that the flow of lubricant into the reservoir cavity 86 occurs at a rate that is equal to or lower than a rate at which the lubricant will flow through the outlet port 90 out of the reservoir cavity 86.

Similarly, the outlet port flow control 104 can comprise a valve element 140 that can be movably coupled to the axle housing 44. Optionally, movement of the valve element 140 of the outlet port flow control 104 can be coordinated with movement of the lubricant skimmer 100 and/or the inlet port flow control 102. In the particular example provided, the valve element 140 of the outlet port flow control 104 is integrally and unitarily formed with the lubricant skimmer 100 and as such, comprises an extension of the plate member 124. The valve element 140 can be coupled to the lubricant skimmer 100 such that the valve element 140 aligns to the outlet port 90 in the reservoir 48 when the lubricant skimmer 100 is in the first skimmer position to thereby inhibit the flow of lubricant in the reservoir cavity 86 through the outlet port 90. The valve element 140 is also positioned relative to the lubricant skimmer 100 such that placement of the lubricant skimmer 100 in the second skimmer position permits the lubricant in the reservoir cavity 86 to flow through the outlet port 90.

The actuator 106 can comprise one or more of any type of device that can be employed to selectively move the lubricant skimmer 100 between the first and second skimmer positions, to move the valve element of the inlet port flow control 102 between a first position (permitting flow through the inlet port 88) and a second position (inhibiting flow through the inlet port 88), and to move the valve element 140 of the outlet port flow control 104 between a first position (inhibiting flow through the outlet port 90 between the reservoir cavity 86 and the sump 82). For example, the actuator 106 could comprise three discrete motors, such as rotary motors, linear motors or a combination of rotary and linear motors, each of which being configured to move an associated one of the lubricant skimmer 100, the valve element of the inlet port flow control 102 and the valve element 140 of the outlet port flow control 104. In the example provided, the lubricant skimmer 100, the valve element of the inlet port flow control 102 and the valve element 140 of the outlet port flow control 104 are coupled for common pivoting movement and consequently, the actuator 106 comprises a single linear (e.g, solenoid), but it will be appreciated that a rotary motor could have been employed in the alternative. If desired, the output of the actuator 106 or one or more of the lubricant skimmer 100, the valve element of the inlet port flow control 102 and the valve element 140 of the outlet port flow control 104 cold be biased into a desired position to cause the lubricant skimmer 100 and/or the valve element of the inlet port flow control 102 and/or the valve element 140 of the outlet port flow control 104 to normally operate in a desired manner. In the particular example provided, a torsion spring (not specifically shown) biases the lubricant skimmer 100 into the second skimmer position and thereby biases the valve element of the inlet port flow control 102 into its second position and the valve element 140 of the outlet port flow control 104 into its second position.

It will be appreciated that the inlet port flow control 102 and/or the outlet port flow control 104 could be configured differently from that which is shown here and could be control valves that could be electrically, pneumatically or hydraulically operated. It will also be appreciated that the actuator 106 is optional and that the lubricant skimmer 100 could be moved between the first and second skimmer positions in response to a force that is applied to the lubricant skimmer 100 by the lubricant that clings to the driven component 110 when the driven component 110 rotates. For example, the lubricant skimmer 100 could be biased into the second skimmer position (via a spring) and a force of the fluid that clings to the driven component 110 and contacts the lubricant skimmer 100 could urge the lubricant skimmer 100 toward the first skimmer position.

With reference to FIGS. 1, 2, 5 and 7, during operation of the drivetrain 14 in the all-wheel drive mode, rotary power is transmitted through the one or more clutches 72 of the differential-and-clutch assembly 58 and the driven component 110 will rotate through the lubricant in the sump 82. The reservoir level control device 50 can be operated in a first mode in which the lubricant skimmer 100 is positioned in the second skimmer position, the valve element of the inlet port flow control 102 is positioned in the second position and the valve element 140 of the outlet port flow control 104 is positioned in the second position. Configuration in this manner minimizes (or eliminates) the flow of lubricant that is skimmed off the driven component 110 as the driven component 110 rotates, inhibits lubricant from flowing through the inlet port 88 into the reservoir cavity 86 and permits the lubricant in the reservoir cavity 86 to be returned to the sump 82.

With reference to FIGS. 1, 2, 5 and 6, the reservoir level control device 50 can be configured to store lubricant in the reservoir cavity 86 when the drivetrain 14 is operated in the front-wheel drive mode or is transitioning to the front-wheel drive mode. If the driven component 110 is disposed between an output of the one or more clutches 72 and an associated one of the output members 56, the driven component 110 can be back-driven during operation of the drivetrain 14 so that the lubricant skimmer 100 can be moved into and maintained in the first skimmer position during the transition from all-wheel drive to front-wheel drive or after the drivetrain 14 has been transitioned to front-wheel drive. Alternatively, if the driven component 110 is disposed between the input member 54 and an input of the one or more clutches 72, the driven component 110 will halt rotation when the drivetrain 14 operates in the front-wheel drive mode so that a limited amount of rotary power would need to be transmitted through the one or more clutches 72 during the transition of the drivetrain 14 from all-wheel drive to front-wheel drive or during operation of the drivetrain 14 in the front-wheel drive mode.

While the reservoir and reservoir level control device have been shown and described in association with the rear axle of a disconnecting all-wheel drive driveline, it will be appreciated that the teachings of the present disclosure have application to various other driveline components, such as power transfer units (PTU's) and transfer cases. Moreover, the reservoir and reservoir level control device can be employed in driveline components even in situations where the driven component is rotated on a continuous basis (i.e., the driven component is not coupled to a clutch that interrupts power to the driven component) when the driveline is operated. Integration of the reservoir and reservoir level control device into a driveline component where the driven component is rotated on a continuous basis may be advantageous, for example, to reduce the amount of lubricant in the sump when the driveline is operated in a predetermined manner (e.g., at a speed in excess of a predetermined speed) to reduce churning or paddling of the lubricant in the sump that occurs when the rotating driven member contacts the lubricant in the sump. Alternatively, lubricant received in the sump could be directed to another component (e.g., via fluid conduits and a fluid pump) under predetermined circumstances that may include engine output torque, vehicle speed, the temperature of a portion of the driveline component, the ambient air temperature, the duration over which the driveline has been operating, a gear ratio in which the vehicle is operating in, and/or whether or not the vehicle is being used to tow an object.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A driveline component comprising:
a power-transmitting device having an input member, a pair of output members, and a differential-and-clutch assembly having at least one clutch, the differential-and-clutch assembly being configured to operate in a first mode, in which rotary power is transmitted from the input member to the output members in a manner that permits speed differentiation between the output members, and in a second mode in which rotary power is not transmitted through the at least one clutch to thereby decouple the input member from at least one of the output members;

a housing in which the power-transmitting device is housed, the housing having a sump that is configured to hold a lubricant that is configured to lubricate at least a portion of the differential and clutch assembly;

a reservoir coupled to the housing, the reservoir defining a reservoir cavity and having a reservoir inlet and a reservoir outlet that are in fluid communication with the reservoir cavity; and a reservoir level control device having a lubricant skimmer and an outlet port flow control, the lubricant skimmer being movably coupled to the housing for movement between a first skimmer position, in which the skimmer is positioned relative to a driven component of the differential-and-clutch assembly to skim the lubricant from the driven component when the driven component is rotated in a predetermined rotational direction and rotary power is transmitted through the at least one clutch, and a second skimmer position, the outlet port flow control being operable in a first condition, in which fluid flow from the outlet port is substantially blocked to thereby inhibit a flow of the lubricant in the reservoir cavity to the sump, and a second condition, in which fluid flow through the outlet port from the reservoir cavity to the sump is permitted;

wherein movement of the skimmer between the first and second skimmer positions is coordinated with operation of the outlet port flow control such that a) the outlet port flow control in the first condition when the skimmer is disposed in the first skimmer position; and b) the outlet port flow control is in the second condition when the skimmer is disposed in the second skimmer position.

2. The driveline component of claim 1, wherein the outlet port flow control is movably coupled to the housing.

3. The driveline component of claim 2, wherein the outlet port flow control is coupled to the skimmer for coordinated movement.

4. The driveline component of claim 3, wherein the reservoir level control device further comprises an actuator for selectively moving the skimmer.

5. The driveline component of claim 3, the skimmer is biased into the second skimmer position.

6. The driveline component of claim 3, wherein contact between the skimmer and a fluid clinging to the driven component when the driven component is rotated in the predetermined rotational direction applies a force to the skimmer that urges the skimmer toward the first skimmer position.

7. The driveline component of claim 1, wherein the reservoir further comprises an inlet port that is in fluid communication with the reservoir cavity, and wherein the reservoir level control device comprises an inlet port flow control that is configured to selectively inhibit flow of the lubricant into the reservoir cavity through the inlet port.

8. The driveline component of claim 7, wherein the inlet port flow control is movably coupled to the housing.

9. The driveline component of claim 8, wherein the inlet port flow control is coupled to the skimmer for coordinated movement.

10. The driveline component of claim 9, wherein the outlet port flow control is coupled to the skimmer for coordinated movement.

11. The driveline component of claim 8, wherein the skimmer includes a scraping member and a scraper cavity that is at least partly bounded by the scraping member, the scraping member being configured to intersect a film of lubricant clinging to the driven component (to scrape fluid from the film of lubricant clinging to the driven component) when the skimmer is in the first skimmer position and the differential-and-clutch assembly is operated in the second mode, and wherein fluid scraped by the scraping member flows into the scraper cavity, the scraper cavity being in fluid communication with the inlet port flow control.

12. The driveline component of claim 1, wherein the driven component is a bevel ring gear.

13. The driveline component of claim 1, wherein the driven component is an element of the at least one clutch.

14. The driveline component of claim 1, wherein the at least one clutch comprises a multi-plate friction clutch having a clutch output member, and wherein the driven component is the clutch output member or a component that is coupled for rotation with the clutch output member.

15. A driveline component comprising:

a power-transmitting device having an input member, a pair of output members, and a differential-and-clutch assembly having at least one clutch, the differential-and-clutch assembly being configured to operate in a first mode, in which rotary power is transmitted from the input member to the output members in a manner that permits speed differentiation between the output members, and in a second mode in which rotary power is not transmitted through the at least one clutch to thereby decouple the input member from at least one of the output members;

a housing in which the power-transmitting device is housed, the housing having a sump that is configured to hold a lubricant that is configured to lubricate at least a portion of the differential and clutch assembly;

a reservoir coupled to the housing, the reservoir defining a reservoir cavity and having a reservoir inlet and a reservoir outlet that are in fluid communication with the reservoir cavity; and means for collecting lubricant to be stored in the reservoir cavity; and means for controlling a fluid level in the reservoir cavity.

16. The driveline component of claim 15, wherein the lubricant collecting means comprises a pivotable skimmer.

17. The driveline component of claim 15, wherein the fluid level controlling means comprises a outlet port flow control and an inlet port flow control that are coupled to the skimmer for movement therewith, the outlet port flow control being configured to control outflow of the lubricant from the reservoir cavity, and the inlet port flow control being configured to control flow between the skimmer and the reservoir cavity.

18. The driveline component of claim 15, wherein the lubricant collecting means is configured to skim lubricant from a driven component and wherein the driven component is a bevel ring gear.

19. The driveline component of claim 15, wherein the lubricant collecting means is configured to skim lubricant from a driven component and wherein the driven component is a component that is disposed between the at least one clutch and an associated one of the output elements.

20. The driveline component of claim 19, wherein the at least one clutch comprises a multi-plate friction clutch having a clutch output member and wherein the driven component is the clutch output member.

21. A driveline component comprising:
- a power-transmitting device having an input member, at least one output member, and means for transmitting rotary power between the input member and the at least one output member, the rotary power transmitting means comprising gearing, at least one clutch, or gearing and at least one clutch;
- a housing in which the power-transmitting device is housed, the housing having a sump that is configured to hold a lubricant that is configured to lubricate at least a portion of the rotary power transmitting means;
- a reservoir coupled to the housing, the reservoir defining a reservoir cavity and having a reservoir inlet and a reservoir outlet that are in fluid communication with the reservoir cavity; and
- a reservoir level control device having a lubricant skimmer and an outlet port flow control, the lubricant skimmer being movably coupled to the housing for movement between a first skimmer position, in which the skimmer is positioned relative to a driven component of the rotary power transmitting means to skim the lubricant from the driven component when the driven component is rotated in a predetermined rotational direction, and a second skimmer position, the outlet port flow control being operable in a first condition, in which fluid flow from the outlet port is substantially blocked to thereby inhibit a flow of the lubricant in the reservoir cavity to the sump, and a second condition, in which fluid flow through the outlet port from the reservoir cavity to the sump is permitted;

wherein movement of the skimmer between the first and second skimmer positions is coordinated with operation of the outlet port flow control such that a) the outlet port flow control in the first condition when the skimmer is disposed in the first skimmer position; and b) the outlet port flow control is in the second condition when the skimmer is disposed in the second skimmer position.

* * * * *